United States Patent [19]

Samson et al.

[11] Patent Number: 5,266,339

[45] Date of Patent: Nov. 30, 1993

[54] PROCESS FOR PREPARING BATTER-COATED, HEATED FOOD PRODUCTS

[75] Inventors: Allan D. Samson, Kennett Square; William E. Bangs, Philadelphia, both of Pa.

[73] Assignee: Campbell Soup Company, N.J.

[21] Appl. No.: 20,094

[22] Filed: Feb. 19, 1993

Related U.S. Application Data

[63] Continuation of Ser. No. 734,387, Jul. 23, 1991, abandoned.

[51] Int. Cl.$^5$ .................... A23L 1/315; A23L 1/325
[52] U.S. Cl. ............................. 426/92; 426/96; 426/281; 426/291; 426/293; 426/296; 426/302
[58] Field of Search ............... 426/92, 96, 281, 289, 426/291, 293, 296, 302

[56] References Cited

U.S. PATENT DOCUMENTS

| | | | |
|---|---|---|---|
| 3,169,069 | 2/1965 | Hanson et al. | 426/291 |
| 3,586,512 | 6/1971 | Mancuzzo | 426/250 |
| 3,989,851 | 11/1976 | Hawley et al. | 426/281 X |
| 4,068,009 | 1/1978 | Rispoli et al. | 426/296 X |
| 4,164,589 | 8/1979 | Kadane et al. | 426/281 |
| 4,199,603 | 4/1980 | Sortwell | 426/92 |
| 4,208,442 | 6/1980 | Evans et al. | 426/296 |
| 4,218,485 | 8/1980 | Lee et al. | 426/296 |
| 4,330,566 | 5/1982 | Meyer et al. | 426/606 |
| 4,496,601 | 1/1985 | Rispoli et al. | 426/554 |
| 4,518,620 | 5/1985 | Monagle et al. | 426/296 X |
| 4,675,197 | 6/1987 | Banner et al. | 426/292 |
| 4,710,391 | 12/1987 | Kirn et al. | 426/291 X |
| 4,755,392 | 7/1988 | Banner et al. | 426/291 X |
| 4,767,637 | 8/1988 | Ek | 426/291 |
| 4,943,438 | 7/1990 | Rosenthal | 426/296 X |

FOREIGN PATENT DOCUMENTS 2185874 8/1987 United Kingdom ............... 426/289

*Primary Examiner*—Arthur L. Corbin
*Attorney, Agent, or Firm*—Robert F. Zielinski

[57] ABSTRACT

A method is disclosed for preparing a battered foodstuff, particularly, chicken, which has the taste, texture and appearance of a fried food, but which has not been fried. The batters of the present invention are applied after the chicken has been cooked and while the chicken is hot. The latent heat of the chicken causes the batter to fix on the chicken. In a preferred embodiment, the batter coated chicken is further coated with a bread crumb mixture before the batter is fixed. The bread crumb mixture may also include flavored vegetable based oils derived from frying chicken for the purpose of imparting savory and fried food flavor characteristics to the non-fried food.

13 Claims, No Drawings

PROCESS FOR PREPARING BATTER-COATED, HEATED FOOD PRODUCTS

This application is a continuation of application Ser. No. 07/734,387 filed Jul. 23, 1991, now abandoned.

FIELD OF INVENTION

This invention pertains to coated foodstuffs having the taste, texture and appearance of fried foods, but which have not been fried. Specifically, the present invention pertains to novel methods of preparing battered and breaded poultry and to novel batter compositions useful in the invention. The present invention also pertains to vegetable oils which have fried and savory flavors that enhance the organoleptic qualities of the battered and breaded poultry on which these oils are used.

BACKGROUND OF THE INVENTION

The deep frying of foods is well known. Typically, foods such as fresh chicken, frozen and fresh fish, or fresh and frozen vegetables are cut-up, dusted with a flour mixture, dipped in a flour batter and then deep-fried in animal fats or vegetable oils, or combinations of these fats and oils, which have been heated to temperatures suitable for frying. Typically, the battered foods are also coated with a bread crumb mixture prior to frying. During frying, the food and the coating are cooked by the exchange of heat from the heated oil to the colder food.

While consumers often prefer the taste, texture and appearance of fried foods, the actual frying process is often messy due to the spattering of the oils in which foods are fried. Frying may therefore be considered somewhat inconvenient. Moreover, it has been recognized that certain disadvantages result in cooking foods in this manner. In particular, in deep-fat frying, the fat or oil in which the food is fried remains at least partially on the food and the result can be a "greasy" feel or taste to the food which is not desirable. Furthermore, there are certain health considerations due to the presence of such added fats and oils in terms of dietary considerations as well as physiological consequences of fats and oils being part of the food intake. Further still, the fats and oils in which such products are fried have limited fry lives and they may pick up off flavors or become oxidized or rancid and must, therefore, be periodically changed or elaborately processed for reuse.

In commercially prepared fried food products which are intended to be reheated by the consumer, the messiness of preparing such products may be avoided; however, the products are still fried and typically include substantial amounts of added fat in the form of oils which remain on the fried coating. The oil which remains adds significant calories to the coated, fried product. Moreover, in a commerical context, the frying of foods often presents difficulties in preparing acceptable coating compositions which provide uniform coating thicknesses and which sufficiently adhere to a product on which the coating is applied. The problems arise in that when coated foods are fried, the coating and the coated food, such as chicken, cook at vastly different rates. This problem is particularly aggravated when the temperature differential between the substrate and the coating is extreme. Moreover, coatings have high moisture contents which, when superheated by the frying oil form steam and may cause the coating to 'explode' off of the chicken. Furthermore, as the chicken is cooked, its moisture will be driven off at a different rate than the coating and the chicken meat will shrink away or otherwise withdraw from the coating. The result of these effects is that portions of coated chicken will have uneven coatings, some portions will have no coating at all and some will have coatings with 'air gaps' between the chicken and the coating. As the chicken is cooled and further processed, the uneven coating has a tendency to flake or otherwise come off of the chicken. Where there are concentrations of coatings or where there are 'air gaps' between the coating and the chicken, consumers often bite into the product expecting fried chicken but, to their disappointment, encounter only fried batter. The cumulative effect of these problems is often considerable quantities of fried chicken products which are commercially unacceptable or otherwise substandard.

While there have been attempts to provide desired fried attributes in non-fried products, these attempts have met with varying degrees of success. These products and processes may involve the addition of high fat coatings or considerable amounts of shortening and other fats which are incorporated into a batter mixture and which when cooked essentially "fries" the coating, which may also typically include a bread crumb mixture, in situ. These processes and the products have obvious disadvantages in that the total amount of fat present even after avoiding the frying step is only slightly less than if the products were actually deep-fat fried. Examples of such high fat coatings are disclosed in U.S. Pat. Nos. 4,755,392 and 4,675,197 to Banner et al.

In recognition of changing dietary preferences, other attempts have been made to produce improved, lower fat foodstuffs which have the appearance, texture and taste of fried foods, but which have not been fried. Typically, in the case of poultry based foodstuffs, which are intended to be reheated by the consumer in microwave or conventional ovens, chicken pieces or nuggets are made from cut-up, skinned and boned, and often texturized, chicken. After preparation, the chicken pieces are typically predusted, battered and cooked, either partially, or to completion, frozen and then packed.

For example, U.S. Pat. No. 4,943,438 to Rosenthal teaches the use of edible oils which may be sprayed or atomized onto the surface of a baked food product. The baked food product is exposed to high temperature heating for purposes of browning and crisping the bread crumb coating. The addition of the edible oil is for improving the ultimate mouth feel of the bread crumb coating by improving its texture. Although it includes less fat than a deep fried product, even Rosenthal involves the addition of considerable amounts of fats in the bread crumb batter which forms part of the bread crumb coating.

Other examples of attempts to produce fried-like coatings are disclosed in the following patents: U.S. Pat. No. 4,496,601 to Rispoli et al.; U.S. Pat. No. 4,218,485 to Lee et al.; U.S. Pat. No. 4,208,442 to Evans et al.; U.S. Pat. No. 4,199,603 to Sortwell; U.S. Pat. No. 3,586,512 to Mancuzzo; and U.S. Pat. No. 4,330,566 to Meyer et al.

These coatings have varying degrees of success in producing a product which is acceptable to the consumer. While they may be more conveniently prepared than fried foods, some of these coatings provide only the 'oily' feel in the mouth which is associated with fried foods, while others provide only a limited 'crispy' texture that frying imparts. Significantly, none of these coatings provide the natural savory and fried flavor characteristics which complement the oily feel of crispy texture to give acceptable fried-like flavor impressions. Moreover, the problems which accompany frying whole, cut-up batter coated chicken are still apparent. These problems include the difference in the rates that the coatings and the coated foods cook due to differences in moisture content and the problems with proper adhesion of the coating to skinned chicken pieces. Still problematic is the shrinkage of the coated meat away from the coating with the resultant flaking of the coating which occurs during further processing. Finally, these products are lacking in that they do not provide any of the fried flavors typically associated with deep-fat frying, nor do they provide any of the savory flavor elements such cooking imparts. Thus, the flavors of these products are organoleptically inferior to the genuine savory and fried flavors achieved by deep-frying.

From the foregoing, it can be seen that it would be desirable to provide foodstuffs which have the taste, texture and appearance of a fried food, but which have not been fried. Furthermore, it would also be desirable to provide foodstuffs which have the taste, texture and appearance of a fried food which are low in added fats and which avoid the problems not adequately solved by prior art coatings and processes. Finally, it can be seen that it would be desirable to provide non-fried foodstuffs which are organoleptically equal or superior to fried foods.

It is an object of the present invention to provide a coating for non-fried foods for the purpose of providing the taste, texture and appearance of fried foods.

It is also an object of the present invention to provide a coating for non-fried foods which have the taste, texture and appearance of fried foods and which avoids the problems associated with the coating and the coated food cooking at different rates.

It is another object of this invention to provide a coating for non-fried foods which have the taste, texture and appearance of fried foods and which avoids the problem of the coating improperly adhering to the product.

It is a further object of this invention to provide a coating for non-fried foods which have the taste, texture and appearance of fried foods and which avoids the problem associated with the shrinkage of the cooked meat away from the coating.

Yet another object of the present invention is to provide breaded coating for non-fried foods which have the taste, texture and appearance of fried foods and which provides natural savory and fried flavors.

It is yet another object of the present invention to provide coating for non-fried foods which have the taste, texture and appearance of fried foods by utilizing vegetable based fryer oils from other food production processes which would be otherwise discarded or which would have to be elaborately processed for re-use.

SUMMARY OF INVENTION

The present invention is concerned with coated foodstuffs, in particular, poultry foodstuffs, which have the taste, texture and appearance of a fried food but which have not, in fact, been fried. Unlike traditional methods of preparing coated foods, the coatings of the present invention are applied after the product has been cooked, preferably to completion, and while the cooked product is still hot. The cooked poultry, typically, skinned, bone-in chicken portions, are predusted with a flour mixture containing spices and selected food grade additives. After predusting, the hot, cooked chicken portions are dipped in a batter mixture comprising the predust and approximately 60% water which coats the chicken. Preferably, the battered chicken portions are then rolled in bread crumbs. The latent (i.e. hot) temperature from the cooked chicken cooks the batter onto the surface of the coated chicken so that the batter fixes or adheres evenly and completely to the surface of the coated chicken. Where bread crumbs are used, the batter fixes both on the chicken and to the bread crumbs. In one embodiment of the invention, the bread crumbs may also include between 5% to 20% by weight of the bread crumb, flavored vegetable oils derived from deep fat frying processes for the frying of chicken.

The vegetable based fryer oils useful in the present invention are obtained from industrial or commercial frying processes before the oils become overly oxidized or otherwise unpalatable. Preferably, the acidity of the oils remains below 1.2 and is preferable in the range of 0.6 to 0.8. Preferably still, these oils are partially fined or filtered as they are used in the fryer and before they are used as disclosed in the present invention.

The present invention is also concerned with imparting a crisp, browned, fried and savory flavored surface to bread-coated foodstuffs which are cooked, predusted, battered, and breaded and which may be further processed and, ultimately, cooked or reheated for consumption by the consumer.

DETAILED DISCLOSURE OF THE INVENTION

The preferred embodiment of the present invention is used to coat cooked chicken; however, other food products to which the present invention may be applied include cooked fish, cooked seafood, cooked red meats and cooked vegetables.

Processes for cooking batter coated foods are well known. For example, in deep frying, a food such as chicken, is portioned, predusted, battered, breaded and deep fried in an edible oil until the food is sufficiently cooked for consumption. As the food becomes cooked, the outer surface typically becomes browned or caramelized which provide certain desirable textures and flavors to the fried food. In other situations where, for instance, the taste, texture and appearance of deep frying is desired, and where it is preferred to avoid deep frying, the chicken may be portioned, predusted, battered and breaded, and either par-fried in oil briefly, or after the battering or breading step, transferred to a preheated oven where it will be cooked to completion. In the industrial or commercial application of either of these processes, the coated and then cooked chicken is typically cooled, frozen and, ultimately, packaged for distribution.

The present invention provides a departure from known prior art processes, in that the steps of coating and then cooking are reversed, thereby eliminating the problems long associated with fried foods, par-fried foods and with other batter coated foods which are coated then cooked. In the broadest embodiment of the present invention, whole raw chicken was cut-up and skinned. After skinning, the chicken portions were injected with a solution comprising water, phosphate, salt, soluble proteins and spices. The solution is used both as a preservative and as a means to enhance the natural moisture of chicken. The preferred composition of this solution is 89.5% water, 2.5% phosphate, 1% salt; and 7% vegetable protein. However, the following ranges for this solution are also acceptable (all percentages are by weight unless designated otherwise):

80–95% water;
1–5% phosphate;
0–5% salt; and
3–15% protein.

The amount of solution injected on a weight basis is preferably in the range of 10% to 15% of the weight of raw chicken; however a range of 5% to 35% is also acceptable. Suitable soluble proteins include animal and vegetable proteins such as casein, wheat gluten, soy and yeast extract.

The injected chicken portions were then transferred to a preheated oven, preferably, a high heat, high humidity multipurpose oven, where the chicken portions were cooked to completion. The hot, moist chicken was then predusted with a flour based predust containing spices and one or more food grade additives. In the preferred embodiment, the preferred predust composition comprises 65% muffin flour, 15% starch, 6.5% whey, 6.5% egg albumin, 4.5% salt and the remainder, spices. However, the following ranges are also acceptable:

50–70% muffin flour;
5–25% starch;
0–15% whey;
0–15% egg albumin;
0–10% salt; and
0–5% spices.

The preferred form of starch is a phosphate modified starch, such as Firm-Tex®, available from National Starch Company, Bridgewater, N.J.

In a preferred embodiment, the hot, moist, predusted chicken was coated with a batter comprised of the predust mixture and water. The preferred composition of the batter is 60% water and 40% predust mixture; however acceptable batters may also be prepared with water in the range of 50% to 92%, depending on the batter formulation and the consistency of the batter desired. In a preferred embodiment, the chicken pieces were fully cooked with the temperature of the cooked chicken in the range of 170° to 195° F., depending on the thickness of the portion and level at which the temperature probe was inserted. In another preferred embodiment, the batter coated chicken portions were further coated with a bread crumb mixture before the batter was fixed. The bread crumb formed approximately 10% to 20% of the total weight of the coated and breaded chicken. In yet another preferred embodiment, the batter coated chicken portions were coated with a bread crumb mixture that contained varying amounts of a vegetable based, chicken flavored oil derived from the deep frying process of chicken. The cooked, battered and breaded chicken portions were cooled, frozen and packed.

Functional food grade adhesives useful in the predust and batter coating of the present invention include, dry gums, such as hyroxypropylcellulose (HMC), carboxymethylcellulose (CMC), microcrystallinzcellulose, alginates and xanthan gum; modified, unmodified and pregelatinized starch adhesives; and naturally occurring protein adhesives such as egg albumin and vital wheat gluten.

In the selection of functional ingredients used the predust and batter formulations for the non-fried foodstuffs of the present invention, two key factors were considered. First was the performance of the batter in the battering process with reference to batter flow and viscosity, batter coverage, batter adhesion and the rate at which the batter fixed both on the chicken and on the breading as the batter set. The second factor was the characteristics of the batter on reconstitution with regard to batter taste, texture of the coating and adhesion of the batter to the substrate, particularly, to the skinned, heated chicken meat. Although not completely understood, the selected predust and batter components are believed to interact in the following general manner. After the hot, moist chicken is coated with a predust containing egg albumin and the food starch, the egg albumin becomes partially hydrated with a portion of the free, unbound water on the protein rich surface of the chicken. The elevated temperatures causes the albumin to coagulate and form a protein 'skin' around the skinless piece of cooked chicken. The food starch, which preferably has low temperature moisture binding and gellation properties, also hydrates on the chicken while binding significant amounts of water in a protein and starch matrix that is formed as the gellation process occurs. This matrix provides a base for the prehydrated components in the aqueous batter to adhere as the chicken is further coated. Significantly, it is necessary for the predust and batter formulations to include both albumin and food starch, which is preferably a phosphate modified starch. In the absence of either these components, the batter formulations are unsatisfactory. Without the starch, for example, the batters tend to be develop leather-like consistency upon reconstitution. Without albumin, the batters result in an objectionable slimy undercoatings and neither albumin nor starch deficient formulations produce batters which have crispy textures upon reheating. The predust and batter of the present invention provide firm, crisp, continuous coatings with good adhesion and binding properties and excellent moisture retention properties upon cooking.

In one embodiment of the present invention, flavored vegetable oils derived from deep frying processes for chicken were applied to bread crumbs which formed part of the coating of the chicken. The preferred bread crumbs were of the extruded type and were toasted prior to use. For generating the desired savory and fried chicken flavors, frying oil was removed from continuous industrial processes for frying chickens. When the acidity of the frying oil was between 0.6 and 1.2, or after the oil has been in use in the continuous frying process for approximately 4 to 10 hours, between 30% to 50% of the oil was removed and maintained at a temperature of approximately 70° to 125° F. to yield a 'flavored oil'. An equivalent amount of fresh oil was then added to the continuous fryer apparatus to replace the oil that was removed and the process was repeated. It is essential that the acidity of the fryer oils, and therefore, the flavored oils removed for flavor enhancement be maintained below 1.2. Preferably still, the acidity should be approximately 0.6 to 0.8. Additionally, the oil contains suspended solids from the frying process in an amount approximately 1% to 10% by weight of the flavored oil, preferably, 2% to 6%.

The generation of savory and fried flavors in vegetable based frying oils during the frying process is believed to occur due to a combination of factors. These factors include, in part: 1) the leaching of fats, fatty acids, esters and other flavor constituents from the substrate into oil during frying; 2) the Mailard Reaction of the batter components as the frying process occurs and 3) the caramelization of suspended solids such as batter, bread crumbs and particles of the foodstuffs being fried. The oils which are useful for providing flavor characteristics in the process of the present invention typically have the following profile: they have significantly higher acidity levels than fresh oils which have not been used for frying; they possess a light golden to dark brown color, depending on the temperature of the fryer and the rate of oil removal; they have a suspended solid content of 1% to 10% depending on the coating system and the effectiveness of the filtration system; and they possess recognizable savory components characterized by the product that was fried in it. Advantageously, the flavored oils used in the present invention have only minute amounts of saturated fats when compared to animal fat based frying oils and furthermore, have no deletrious cholesterols or other less desirable congeners which such animal fat based frying oils possess.

As used herein, the term 'savory flavor' refers to the pleasant and recognizable flavor notes typically associated with the taste and aroma of a particular food as a result of cooking (i.e. chicken flavors associated with chicken, fish flavors associated with fish), The term 'fried flavor' as used herein refers to those flavor notes typically imparted by the frying of food.

The flavored oils were incorporated into bread crumbs which form part of the coating of the chicken. The oils were mixed with the crumbs in a ribbon mixer before the crumbs were used in the coating, although it is also practical to spray the oils onto the finished product after it is coated. Typically, the oil content of the crumbs ranged from 1 to 22% by weight of the crumb, with the upper limit being determined by flow or mechanical difficulties with processing the crumb which occur when the oil content exceeds roughly 25% by weight of the crumb.

The preferred oil for use in generating flavored oils is one which is relatively bland or not strongly flavored and one which is able to withstand the temperatures typically utilized in frying foods, such as a mixture of soybean and corn oils. Other suitable commercially available oils include vegetable fats and oils such as sunflower, rapeseed, low erucic acid rapeseed, canola, cottonseed, safflower, olive, nasturtium seed, tiger seed, ricebran and wallflower and, nut fat oils, such as palm, palm kernel, babassu, or peanut, as well as mixtures of these oils. Vegetable oils which are highly flavored, such as sesame and coconut, may also be used; however, it is preferred that such oils be stripped and deodorized as is known in the art, before they are used in the present invention.

The preferred form of chicken for the present invention is fresh, raw or frozen and thawed, cut-up, skinned chicken portions; however, other forms of chicken (i.e. bonded, unskinned, macerated) as well as other poultry, and other cooked meats, may be used in this invention. Suitable meats for use in accordance with the present invention include turkey, turkey parts, and macerated or ground turkey; duck, duck parts and macerated or ground duck; beef, beef chunks, ground beef; pork, pork chunks, ground pork; lamb, lamb chunks, and ground lamb, and combinations thereof.

EXAMPLES

EXAMPLE 1

Twelve pieces of raw, cut-up and skinned chicken consisting of legs, thighs and split breasts, weighing approximately 4 to 7 oz. each were injected with a solution comprising, water, phosphates, hydrolyzed vegetable protein, salt, starches and spices. After injection the chicken pieces were placed in a multipurpose oven which was preheated to a temperature of between 325° to 375° F., preferably, 350° F. and a wet bulb temperature of approximately 165° F. for approximately 12 to 18 minutes. After cooking, the hot, moist chicken was dusted with the preferred predust mixture and then dipped in a prepared batter made from the preferred predust formulation and approximately 60% water. The latent heat of the hot, moist chicken caused the batter to cook in place on the chicken. The chicken pieces were then cooled, frozen and packed.

Upon reheating in a conventional oven, the chicken pieces were observed to be coated uniformly and evenly with cooked batter. There were no 'air gaps' or uneven concentrations of cooked batter, nor was there any observed flaking of the batter from the chicken.

EXAMPLE 2

Twelve pieces of raw, cut-up and skinned chicken consisting of legs, thighs and split breasts, weighing approximately 4 to 7 oz. each were handled in the manner set forth in Example 1. After the cooked, still hot, chicken pieces were coated with batter, but before the batter was fixed, the battered chicken pieces were then rolled in a bread crumb mixture consisting of pre-cooked, triple toasted, extruded bread crumbs, spices and fresh vegetable oil to yield battered and breaded chicken pieces. The oil content of the crumb comprised approximately 10% by weight of the crumb. The latent heat of the hot, moist chicken caused the batter to cook in place on the chicken. The chicken pieces were then cooled, frozen and packed.

Upon reheating in a conventional oven, the chicken pieces were observed to be coated uniformly and evenly with cooked batter. There were no 'air gaps' or uneven concentrations of cooked batter, nor was there any observed flaking of the batter from the chicken. The cooked chicken products were judged to have a crispy exterior and moist cooked interior, generally similar to fried chicken.

EXAMPLE 3

Forty-eight chicken pieces from cut-up and skinned chicken weighing approximately 4 to 7 oz. each were prepared essentially as in Example 2. After the chicken pieces were predusted and battered, and before the batter was fixed, the pieces were rolled in bread crumb mixtures consisting of triple toasted, extruded bread crumbs, spices and varying amounts of flavored oil obtained from the deep-frying of chicken, to yield battered and breaded chicken pieces. The latent heat of the hot, moist chicken caused the batter to cook in place on the chicken and to fix the bread crumbs in place.

The flavored oil, derived from the deep frying of chicken, had an acidity of approximately 0.7 and a suspended solid content of approximately 5% by weight of the oil. The flavored oil was incorporated in the bread crumb by mixing the flavored oils onto the crumbs in a range of approximately 5 to 20%.

In this Example, twelve chicken pieces received bread crumb coatings having an oil content of approximately 5%, twelve chicken pieces received bread crumb coatings having an oil content of approximately 10%, twelve chicken pieces received bread crumb coatings having an oil content of approximately 15% and twelve chicken pieces received bread crumb coatings having an oil content of approximately 20%. The chicken pieces were then cooled, frozen and packed.

Upon reheating in a conventional oven, the chicken pieces were observed to be coated uniformly and evenly with cooked batter. There were no 'air gaps' or uneven concentrations of cooked batter, nor was there any observed flaking of the batter from the chicken. The cooked chicken pieces were judged to have crispy exterior and moist cooked interiors. The aromas were similar to those of fried chicken and were generally considered organoleptically superior to the chicken pieces of Example 2 and, in general, virtually indistinguishable from fried chicken.

In particular, in order of preference, the chicken pieces receiving flavored oil in the range from 10% to 15% were judged to have pleasant fried flavors and were slightly buttery with definite pleasant chicken flavors. The chicken pieces having flavored oil contents of approximately 10% were considered to have less pronounced flavors than those having approximately 15% flavored oil. The chicken pieces having a bread crumb with an oil content of approximately 5% also exhibited fried and savory flavors, but, the flavor impact was less than the chicken pieces which incorporated higher amounts of the flavored oil.

EXAMPLE 4

Twelve chicken pieces of approximately 4 to 7 oz. each were prepared essentially as set forth in Example 2. After the chicken pieces were predusted and battered, and before the batter was fixed, the pieces were rolled in bread crumb mixtures consisting of triple toasted, extruded bread crumbs, spices and predetermined amounts of flavored oil obtained from the deep-frying of chicken, to yield battered and breaded chicken pieces. The latent heat of the hot, moist chicken caused the batter to cook in place on the chicken and to fix the bread crumbs in place. The flavored oil derived from the frying of chicken had an acidity of approximately 1.4 and a suspended solid content of approximately 5% by weight of the oil. The chicken pieces were then cooled, frozen and packed.

Upon reheating in a conventional oven, the chicken pieces were observed to be coated uniformly and evenly with cooked batter. There were no 'air gaps' or uneven concentrations of cooked batter, nor was there any observed flaking of the batter from the chicken.he cooked chicken products were judged to have crispy exteriors and moist cooked interiors. The aromas were considered to be predominantly fried and savory although, somewhat rancid, overcooked notes were present. The taste of chicken pieces prepared in this manner were generally considered inferior to fried chicken and were also considered inferior to the chicken pieces produced in Examples 2 and 3.

STATEMENT OF INDUSTRIAL UTILITY

The present invention is also useful for producing breaded foodstufs which have the taste, texture and appearance of a fried food, but which have not been fried. The present invention is also useful for providing a method for preparing battered and breaded poultry products which are coated after they are cooked. The method of the present invention ensures better adhesion of the batter on the product and avoids many problems associated with products which are coated then cooked.

The battered and breaded products of the present invention may also include the addition of flavored vegetable oils which provide savory and fried flavors.

While the present invention has been particularly described with respect to certain specific embodiments, it will be appreciated that adaptations and modifications will become apparent from the present disclosure and are intended to within scope of the following claims.

What is claimed is:

1. A process for preparing a food product consisting essentially of the steps of:
   (a) portioning a first foodstuff substrate;
   (b) heating said foodstuff substrate to an internal temperature of about 165° F. to about 195° F. in an oven to form a heated foodstuff; and then
   (c) coating said heated foodstuff substrate with a heat setting batter, said batter including a phosphate modified starch, while said foodstuff substrate is sufficiently heated to permit said batter to set and cook as a result of the latent heat of said heated foodstuff substrate;
   wherein the latent heat of said heated foodstuff causes said batter to cook in place on and fix onto said foodstuff without subsequent frying of the coated and heated foodstuff substrate.

2. The process of claim 1 wherein step (b) further includes the step of coating the heated foodstuff with a predust, prior to coating with said batter.

3. The process of claim 2 further including the step of:
   (d) coating the heated battered foodstuff with bread crumbs prior to said fixing of said batter.

4. The process of claim 3 wherein said bread crumbs are extruded bread crumbs.

5. The process of claim 2 further including the step of:
   (d) coating the heated battered foodstuff with a bread crumb mixture, said mixture formed from bread crumbs and a flavored vegetable based fryer oil, said fryer oil having previously been used to fry a second batter coated foodstuff, said bread crumb mixture coating step occurring prior to said fixing of said batter.

6. The process of claim 5 wherein said fryer oil has an acidity between 0.6 and 1.2 and suspended solids in the amount of 1% to 10% by weight of said oil.

7. The process of claim 5 wherein the weight of said fryer oil is less than 25% of the weight of said crumbs.

8. The process of claim 2 wherein said predust is comprised of 50% to 70% muffin flour and 5% to 25% modified starch.

9. The process of claim 8 wherein said batter is comprised of said predust composition and 50% to 92% water.

10. The process of claim 2 wherein step (a) further includes injecting said first foodstuff with a solution comprising approximately 89.5% water, 2.5% phosphate, 1% salt and 7% vegetable protein, prior to said heating.

11. The process of claim 2 wherein said first foodstuff is raw skinned chicken.

12. The process of claim 2 wherein said oven is humidified.

13. A process for preparing a food product consisting essentially of the steps of:
   a) portioning a foodstuff substrate from raw, skinned chicken;
   b) injecting said foodstuff with a solution consisting of 80% to 95% water, 1% to 5% phosphate, 0% to 5% salt and 3% to 15% soy protein;

c) heating said foodstuff to a temperature of about 165° F. to about 195° F. in a high heat, high humidity oven to form a heated foodstuff;

d) removing the heated foodstuff from the oven;

e) coating the heated foodstuff with a predust mixture consisting of 50% to 75% muffin flour, 5% to 25% phosphate modified starch, 0% to 15% whey, 0% to 15% egg albumin, 0% to 10% salt and 0% to 5% spices;

f) coating the heated, predusted foodstuff with a heat setting batter consisting of 8% to 50% of said predust mixture and 50% to 92% water, while said heated foodstuff is sufficiently heated to set and cook said batter as a result of the latent heat of said heated food stuff; and then g) coating the heated, predusted and battered foodstuff with a breadcrumb mixture prior to the setting of said batter, the breadcrumb mixture consisting of extruded breadcrumbs and 5% to 25% flavored vegetable based fryer oil by weight of the crumbs, said oil derived from frying batter coated chicken and having an acidity of 0.6 to 1.2 and suspended solids in the amount of 1% to 10% by weight of the oil, wherein the latent heat of the heated foodstuff causes the batter to cook in place on the foodstuff and onto the breadcrumbs without subsequent frying of the battered and breadcrumb coated foodstuff.

* * * * *